US008966060B2

(12) United States Patent
Miyazaki et al.

(10) Patent No.: US 8,966,060 B2
(45) Date of Patent: Feb. 24, 2015

(54) DETERMINATION APPARATUS AND DETERMINATION METHOD TO ANALYZE TRAFFIC BETWEEN A CLIENT DEVICE AND A SERVER GROUP

(75) Inventors: Hideaki Miyazaki, Kobe (JP); Yuji Nomura, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 115 days.

(21) Appl. No.: 13/198,069

(22) Filed: Aug. 4, 2011

(65) Prior Publication Data
US 2012/0042049 A1    Feb. 16, 2012

(30) Foreign Application Priority Data
Aug. 10, 2010    (JP) ................. 2010-179723

(51) Int. Cl.
| | | |
|---|---|---|
| G06F 15/173 | (2006.01) | |
| G06Q 20/00 | (2012.01) | |
| H04L 12/24 | (2006.01) | |
| H04L 12/26 | (2006.01) | |
| H04L 29/06 | (2006.01) | |

(52) U.S. Cl.
CPC ........ *H04L 41/0677* (2013.01); *H04L 43/0876* (2013.01); *H04L 63/0272* (2013.01); *H04L 43/0817* (2013.01)
USPC ............. 709/224; 709/219; 705/39; 702/182; 713/320

(58) Field of Classification Search
USPC .......... 709/217–226, 237–238; 370/232, 248, 370/352, 389, 392, 422; 707/999.1, 707/E17.044; 718/105; 714/25, E11.207; 726/4, 5; 705/39; 702/182; 713/320
See application file for complete search history.

(56) References Cited

U.S. PATENT DOCUMENTS

| | | | |
|---|---|---|---|
| 6,182,146 B1* | 1/2001 | Graham-Cumming, Jr. . | 709/238 |
| 2006/0221815 A1 | 10/2006 | Matsumoto | |
| 2006/0287948 A1* | 12/2006 | Ernst ............................... | 705/39 |
| 2007/0177598 A1 | 8/2007 | Miyazaki et al. | |
| 2007/0192492 A1* | 8/2007 | Okazaki ........................ | 709/226 |
| 2007/0208852 A1* | 9/2007 | Wexler et al. ................. | 709/224 |
| 2008/0062874 A1* | 3/2008 | Shimadoi ...................... | 370/232 |
| 2008/0133549 A1* | 6/2008 | Auvenshine et al. .......... | 707/100 |

(Continued)

FOREIGN PATENT DOCUMENTS

| | | | |
|---|---|---|---|
| JP | 2002-082926 A | 3/2002 | |
| JP | 2004-228828 A | 8/2004 | |

(Continued)

*Primary Examiner* — Wing F Chan
*Assistant Examiner* — Raji Krishnan
(74) *Attorney, Agent, or Firm* — Fujitsu Patent Center

(57) ABSTRACT

A determination apparatus includes a processor and a storage unit. The processor acquires through a communication network a request packet transmitted from a client device to a server device group or a reply packet transmitted from the server device group to the client device. The server device group includes a first server device and one or more second server devices. The first server device is connected to the client device through the communication network. The storage unit stores configuration information for determining a source of the acquired reply packet. The processor determines whether the source of the acquired reply packet is the first server device or one of the second server devices on the basis of the configuration information stored in the storage unit.

9 Claims, 15 Drawing Sheets

(56) References Cited

U.S. PATENT DOCUMENTS

2009/0031022 A1* 1/2009 Wexler et al. ............... 709/224
2009/0187654 A1* 7/2009 Raja et al. .................. 709/224

FOREIGN PATENT DOCUMENTS

| | | |
|---|---|---|
| JP | 2006-285377 A | 10/2006 |
| JP | 2007-208328 A | 8/2007 |

\* cited by examiner

| TYPE | IDENTIFIER | FINAL PROCESSING SERVER |
|---|---|---|
| URI | http://xxx/servlet/* | APPLICATION SERVER |
| URI | http://xxx/image/* | WEB SERVER |
| EXTENSION | gif, jpg | WEB SERVER |
| EXTENSION | jsp, cgi | APPLICATION SERVER |
| CONTENT TYPE | image/* | WEB SERVER |
| REPLY CODE | 404 | WEB SERVER |
| REPLY CODE | 503 | APPLICATION SERVER |

FIG. 3

| No. | CLIENT ADDRESS | SERVER ADDRESS | REQ. TIME | REQUEST DATA | REPLY TIME | REPLY DATA | SIZE | FD |
|---|---|---|---|---|---|---|---|---|
| 1 | 1.1.1.1:010000 | 2.1.1.1:80 | 10:00:00 | POST http://xx/.. | 10:00:05 | HTTP/1.1 200 OK | 8KB | BS |
| 2 | 1.1.1.1:010000 | 2.1.1.1:80 | 10:00:02 | GET http://xx/xx.jpg | 10:00:03 | HTTP/1.1 200 OK | 100KB | FS |
| 3 | 1.1.1.1:010000 | 2.1.1.1:80 | 10:00:04 | GET http://xx/xx.jsp | 10:00:09 | HTTP/1.1 200 OK | 19KB | BS |
| 4 | 1.1.1.1:010000 | 2.1.1.1:80 | 10:00:06 | GET http://xx/cgi/sendmail | 10:00:11 | HTTP/1.1 200 OK | 30KB | BS |
| 5 | 1.1.1.1:010000 | 2.1.1.1:80 | 10:00:10 | GET http://xx/.. | 10:00:11 | HTTP/1.1 404 Not Found | 0.5KB | FS |
| 6 | 1.1.1.1:010000 | 2.1.1.1:80 | 10:00:12 | GET http://xx/.. | 10:00:13 | HTTP/1.1 200 OK Content-Type: image/gif | 60KB | FS |
| 7 | 1.1.1.1:010000 | 2.1.1.1:80 | 10:01:00 | GET http://xxx/ | 10:01:01 | HTTP/1.1 200 OK | 2KB | FS |
| 8 | 1.1.1.1:010000 | 2.1.1.1:80 | 10:01:01 | POST http://xxx/cgi | 10:01:04 | HTTP/1.1 503 NG | 0.5KB | BS |
| 9 | 1.1.1.1:010000 | 2.1.1.1:80 | 10:02:01 | POST http://xxx/cgi | 10:02:04 | HTTP/1.1 503 NG | 0.5KB | BS |

FIG. 4

| TYPE | THRESHOLD | FINAL PROCESSING SERVER |
|---|---|---|
| Delay_min | X | Delay_min≤X: WEB SERVER |
| Delay_stdev | Y | Delay_stdev≤Y: WEB SERVER |
| Size_stdev | Z | Size_stdev≥Z: AP SERVER |

FIG. 8

| No. | CLIENT ADDRESS | SERVER ADDRESS | REQ. TIME | REQUEST DATA | REPLY TIME | REPLY DATA | SIZE | FD |
|---|---|---|---|---|---|---|---|---|
| 1 | 1.1.1.1:010000 | 2.1.1.1:80 | 10:00:00 | POST http://xx/.. | 10:00:05 | HTTP/1.1 200 OK | 8KB | BS |
| 2 | 1.1.1.2:010000 | 2.1.1.1:80 | 10:00:00 | GET http://xx/xx.jpg | 10:00:01 | HTTP/1.1 200 OK | 100KB | FS |
| 3 | 1.1.1.3:010000 | 2.1.1.1:80 | 10:00:00 | GET http://xx/xx.jsp | 10:00:05 | HTTP/1.1 200 OK | 19KB | BS |
| 4 | 1.1.1.4:010000 | 2.1.1.1:80 | 10:00:00 | GET http://xx/cgi/sendmail | 10:00:05 | HTTP/1.1 200 OK | 30KB | BS |
| 5 | 1.1.1.5:010000 | 2.1.1.1:80 | 10:00:00 | GET http://xx/.. | 10:00:01 | HTTP/1.1 404 Not Found | 0.5KB | FS |
| 6 | 1.1.1.6:010000 | 2.1.1.1:80 | 10:00:00 | GET http://xx/.. | 10:00:01 | HTTP/1.1 200 OK Content-Type: image/gif | 60KB | FS |
| 7 | 1.1.1.7:010000 | 3.1.1.1:80 | 10:00:00 | GET http://xxx/ | 10:00:01 | HTTP/1.1 200 OK | 2KB | FS |
| 8 | 1.1.1.8:010000 | 3.1.1.1:80 | 10:00:01 | POST http://xxx/cgi | 10:00:04 | HTTP/1.1 503 NG | 0.5KB | BS |
| 9 | 1.1.1.9:010000 | 3.1.1.1:80 | 10:00:01 | POST http://xxx/cgi | 10:00:04 | HTTP/1.1 503 NG | 0.5KB | BS |
| 10 | 1.1.1.10:010000 | 4.1.1.1:80 | 10:00:00 | GET http://yy/htm | No reply | | | FS |
| 11 | 1.1.1.11:010000 | 4.1.1.1:80 | 10:00:01 | POST http://yy/cgi | No reply | | | BS |
| 12 | 1.1.1.12:010000 | 4.1.1.1:80 | 10:00:02 | POST http://yy/cgi | No reply | | | BS |
| 13 | 1.1.1.13:010000 | 5.1.1.1:80 | 10:00:02 | GET http://xxx/ | 10:00:02 | HTTP/1.1 200 OK | 1KB | FS |
| 14 | 1.1.1.14:010000 | 5.1.1.1:80 | 10:00:02 | GET http://xxx/cgi | 10:00:12 | HTTP/1.1 200 OK | 22KB | BS |
| 15 | 1.1.1.15:010000 | 5.1.1.1:80 | 10:00:04 | POST http://xxx/cgi | 10:00:12 | HTTP/1.1 200 OK | 22KB | BS |

FIG. 11

| ITEMS | | 3.1.1.1 | | 4.1.1.1 | | 5.1.1.1 | |
|---|---|---|---|---|---|---|---|
| | | FRONT-END SERVER | BACK-END SERVER | FRONT-END SERVER | BACK-END SERVER | FRONT-END SERVER | BACK-END SERVER |
| ABNORMALLY REPLIED | NG-REPLIED | 0 | 2 | 0 | 0 | 0 | 0 |
| | NON-REPLIED | 0 | 0 | 1 | 2 | 0 | 0 |
| | LATE-REPLIED | 0 | 0 | 0 | 0 | 0 | 2 |
| NORMALLY REPLIED | | 1 | 0 | 0 | 0 | 1 | 0 |

FIG. 12

DETERMINATION APPARATUS AND DETERMINATION METHOD TO ANALYZE TRAFFIC BETWEEN A CLIENT DEVICE AND A SERVER GROUP

CROSS-REFERENCE TO RELATED APPLICATION

This application is based upon and claims the benefit of priority of the prior Japanese Patent Application No. 2010-179723, filed on Aug. 10, 2010, the entire contents of which are incorporated herein by reference.

FIELD

The embodiments discussed herein are related to a determination apparatus analyzing traffic on a network.

BACKGROUND

In recent years, with an improvement of information and communication technology (ICT) infrastructures, network services have been widely used. It is important for service providers to manage systems so as to provide services to users in a stable manner at any time. When a failure such as a disconnection or a delay occurs, it may be necessary to quickly restore an interested server or network.

In general, a single network service is provided by a plurality of servers that are connected to each other through a network. When a failure occurs, it may be necessary to determine a server or a network that is the cause of the failure. For example, a web service involves a web server that receives requests from a client device, an application (AP) server that performs a process for each of the requests in a backyard, a database server that manages data, and the like. When a disconnection or a delay occurs in the client device, it may be necessary to determine a server or a network that causes the disconnection or the delay.

One of methods for determining the location of a failure in a network is a method for analyzing traffic on a wide area network (WAN) and thereby determining whether a failure exists on the WAN or a local area network (LAN). Specifically, traffic that comes from the LAN, and traffic that comes from a router located at the boundary between the LAN and the WAN, are distinguished from each other to determine the location of the failure by comparing the quality of the traffic coming from the LAN with the quality of the traffic coming from the router.

Japanese Laid-open Patent Publication No. 2007-208328 discloses a related technique.

SUMMARY

According to an aspect of the present invention, provided is a determination apparatus including a processor and a storage unit. The processor acquires through a communication network a request packet transmitted from a client device to a server device group or a reply packet transmitted from the server device group to the client device. The server device group includes a first server device and one or more second server devices. The first server device is connected to the client device through the communication network. The storage unit stores configuration information for determining a source of the acquired reply packet. The processor determines whether the source of the acquired reply packet is the first server device or one of the second server devices on the basis of the configuration information stored in the storage unit.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 3 is a diagram illustrating an exemplary data structure of configuration information stored in an configuration information storage unit according to an embodiment of the present invention;

FIG. 4 is a diagram illustrating an exemplary data structure of data stored in a measured data database according to an embodiment of the present invention;

FIG. 8 is a diagram illustrating an exemplary data structure of configuration information stored in an configuration information storage unit according to an embodiment of the present invention;

FIG. 11 is a diagram illustrating an exemplary data structure of data stored in a measured data database according to an embodiment of the present invention;

FIG. 12 is a diagram illustrating an example of results of accumulation according to an embodiment of the present invention;

DESCRIPTION OF EMBODIMENTS

In the aforementioned method, it is determined, on the basis of contents, such as an address or a protocol, described in a packet, whether traffic has come from the LAN or the router located at the boundary between the LAN and the WAN. However, in an environment in which a network service is provided by a plurality of servers as discussed above, traffic that is a reply packet originally provided by a front-end server, and traffic that is a reply packet originally provided by a back-end server, indicate the same address or the same protocol. Thus, it is not possible to distinguish a traffic that is a reply packet provided by the front-end server from a traffic that is a reply packet provided by the back-end server on the basis of contents described in packets.

Accordingly, it is preferable to provide a determination apparatus which analyzes traffic between a client device and a server device group and thereby determines whether the traffic is a reply packet originally provided by a front-end server or a back-end server.

According to the embodiments, it is possible to acquire and analyze traffic (a request packet or a reply packet) between the client device and the server device group on a communication path and thereby determine whether a final processing server, i.e., a source of the reply packet, of the request packet is the front-end server or the back-end server.

The embodiments of the present invention will be discussed below with reference to the accompanying drawings.

First Embodiment

Figure 1:
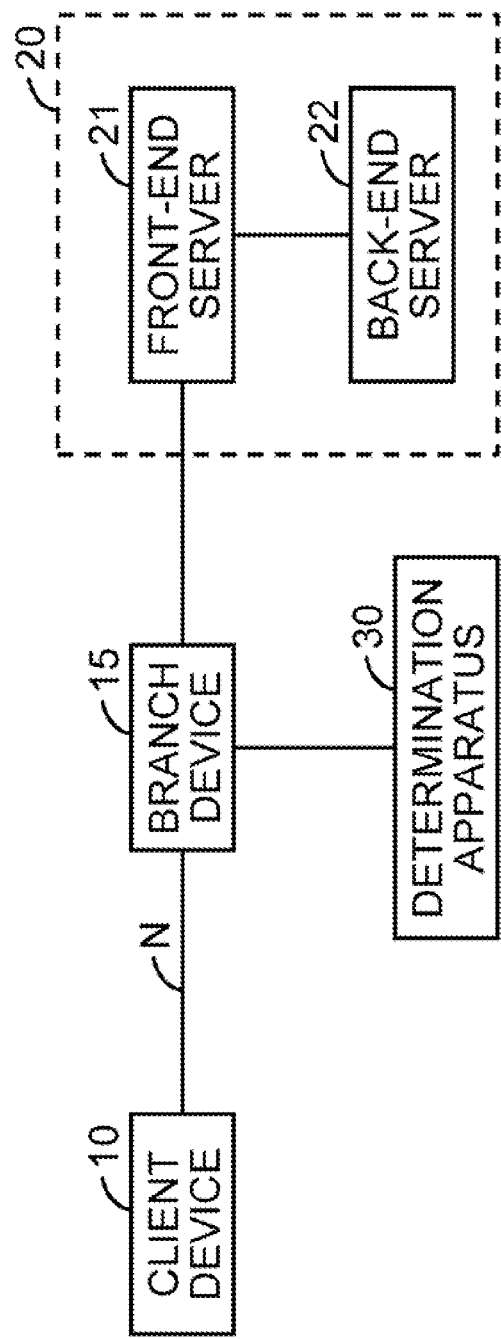
FIG. 1 is a diagram illustrating an exemplary configuration of a determination system according to an embodiment of the present invention.

FIG. 1 illustrates an exemplary configuration of a determination system according to a first embodiment of the present invention. In the determination system according to the present embodiment, a client device 10 and a server device group 20 are connected to each other through a communication network N, and a determination apparatus 30 monitors traffic on the communication network N.

The server device group 20 includes a front-end server 21 and a back-end server 22. The front-end server 21 receives access from the client device 10. The back-end server 22 functions in a backyard. The front-end server 21 is a web server, for example. The back-end server 22 is an application server, for example. The front-end server 21 and the back-end server 22 interoperate with each other and form the server device group 20 that provides a web service to the client device 10.

The present embodiment applies to an example of the system that provides the web service on the communication network N. However, the present embodiment may apply to another system. For example, the present embodiment may apply to a system in which the front-end server 21 is a proxy server and the back-end server 22 is a web server. In addition, the present embodiment may apply to a system in which the front-end server 21 is a session initiation protocol (SIP) server and the back-end server 22 is a database server.

In the example illustrated in FIG. 1, the single client device 10 and the single server device group 20 including a single back-end server 22 are provided. However, the determination apparatus 30 may monitor packets that are transmitted and received between a plurality of client devices and a plurality (or a plurality of types) of server device groups each including a plurality of back-end servers.

The client device 10 is a terminal device (such as a personal computer or a mobile phone) that is used by a user who receives the web service. A web browser is installed in the client device 10 as software for allowing the client device 10 to access the front-end server 21. The client device 10 receives a request of the user via the web browser and transmits the received request to the server device group 20. In this case, the client device 10 transmits a request packet to the server device group 20 through the communication network N. The client device 10 receives through the communication network N a reply packet provided by the front-end server 21 or the back-end server 22 in response to the request packet.

The determination apparatus 30 is connected to the communication network N via a branch device 15 provided on a path of the communication network N so that the determination apparatus 30 may monitor traffic, i.e., packets that are transmitted and received between the client device 10 and the server device group 20, on the communication network N. The branch device 15 is a network switch, a network tap or the like. The branch device 15 transfers the request packet transmitted from the client device 10 and the reply packet provided by the front-end server 21 or the back-end server 22 to destinations of the packets, and transmits packets having contents identical to that of the request packet or the reply packet to the determination apparatus 30.

On the basis of a packet acquired via the branch device 15, the determination apparatus 30 determines whether the acquired request packet finally arrives at the front-end server 21 or the back-end server 22, or determines whether the acquired reply packet is originally provided by the front-end server 21 or the back-end server 22.

Figure 2:
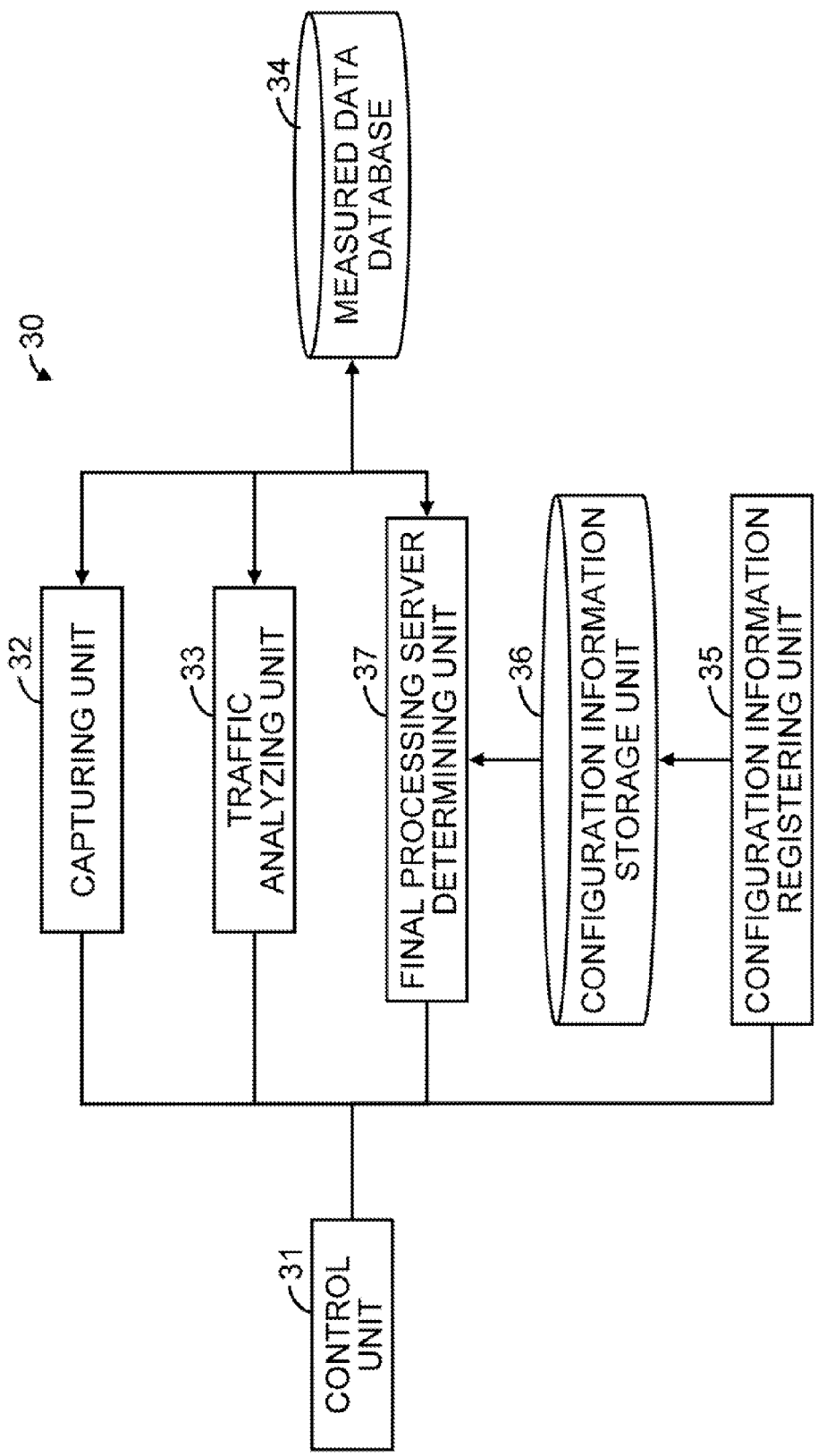
FIG. 2 is a diagram illustrating an exemplary functional configuration of a determination apparatus according to an embodiment of the present invention.

FIG. 2 illustrates an exemplary functional configuration of the determination apparatus 30 according to the present embodiment. The determination apparatus 30 includes a control unit 31, a capturing unit 32, a traffic analyzing unit 33, a measured data database (DB) 34, a configuration information registering unit 35, an configuration information storage unit 36 and a final processing server determining unit 37.

The control unit 31 controls the entire determination apparatus 30 including aforementioned components.

The capturing unit 32 acquires, via the branch device 15, web traffic packets (request packets and reply packets) that are transmitted and received between the client device 10 and the server device group 20.

The traffic analyzing unit 33 analyzes the packets acquired by the capturing unit 32, organizes data for each pair of a request and a reply thereto, and stores the organized data in the measured data database 34.

The configuration information registering unit 35 receives information, which is manually entered by an operator, regarding the relationship between identifier data and a final processing server of a packet in order to determine the final processing server of the packet. The identifier data that is received by the configuration information registering unit 35 includes a uniform resource identifier (URI), a file extension, a content type, path information, and the like. In the present embodiment, the final processing server is set to either a web server as the front-end server 21 or an application server as the back-end server 22. The configuration information registering unit 35 stores the information regarding the relationship between the identifier data and the final processing server of the packet in the configuration information storage unit 36.

FIG. 3 illustrates an exemplary data structure of the configuration information stored in the configuration information storage unit 36. Information regarding relationships among the type of the identifier data, contents of the identifier data and the server device that is the final processing server of the packet is stored in the configuration information storage unit 36. According to the example illustrated in FIG. 3, when a request packet includes a URI "http://xxx/servlet/*" (a symbol * indicates an arbitrary character string), the final processing server of the request packet is an application server. Also, when a request packet includes an URI "http://xxx/image/*", the final processing server of the request packet is a web server. In addition, when a request packet includes a file name with a file extension "gif", the final processing server of the request packet is a web server. When a request packet includes a file name with a file extension "jsp", the final processing server of the request packet is an application server. Furthermore, when a request packet includes "image/*" in a field of the content type, the final processing server of the request packet is a web server.

The identifier data illustrated in FIG. 3 is an example. An error number that is included in a reply code may be registered in addition to the URI, the file extension and the content type. For example, since a reply code that includes an error number "404" is a code that is provided by a web server and indicates that no URI that matches a specified URI exists, the final processing server of the request packet may be set to a web server. In addition, since a reply code that includes an error number "503" is a code that indicates that a server may not be used owing to a temporary overload or the like, the final processing server of the request packet may be set to an application server.

The final processing server determining unit 37 determines, on the basis of the configuration information stored in the configuration information storage unit 36, whether the final processing server of the request packet transmitted from the client device 10 is the front-end server 21 or the back-end server 22. The final processing server determining unit 37 stores the result (final processing server) of the determination in the measured data database 34.

FIG. 4 illustrates an exemplary data structure of data stored in the measured data database 34. As discussed above, information of the packet acquired by the capturing unit 32 and the result of the determination made by the final processing server determining unit 37 are stored in the measured data database 34. The information of the packets stored in the measured data database 34 includes a communication address (titled as "client address" in the drawings) accompanied by a port number of the client device, a communication address (titled as "server address" in the drawings) accompanied by a port number of the server device, a reception time (titled as "req. time" in the drawings) and contents (titled as "request data" in the drawings) of the request packet, and a reception time (titled as "reply time" in the drawings), contents (titled as "reply data" in the drawings) and data size (titled as "size" in the drawings) of the reply packet. In addition, as the result of the determination made by the final processing server determining unit 37, data (titled as "FD" in the drawings) indicating the final processing server (the front-end server 21 or the back-end server 22) is stored in the measured data database 34.

In the example illustrated in FIG. 4, the front-end server 21 is indicated by "FS" and the back-end server 22 is indicated by "BS".

Figure 5:
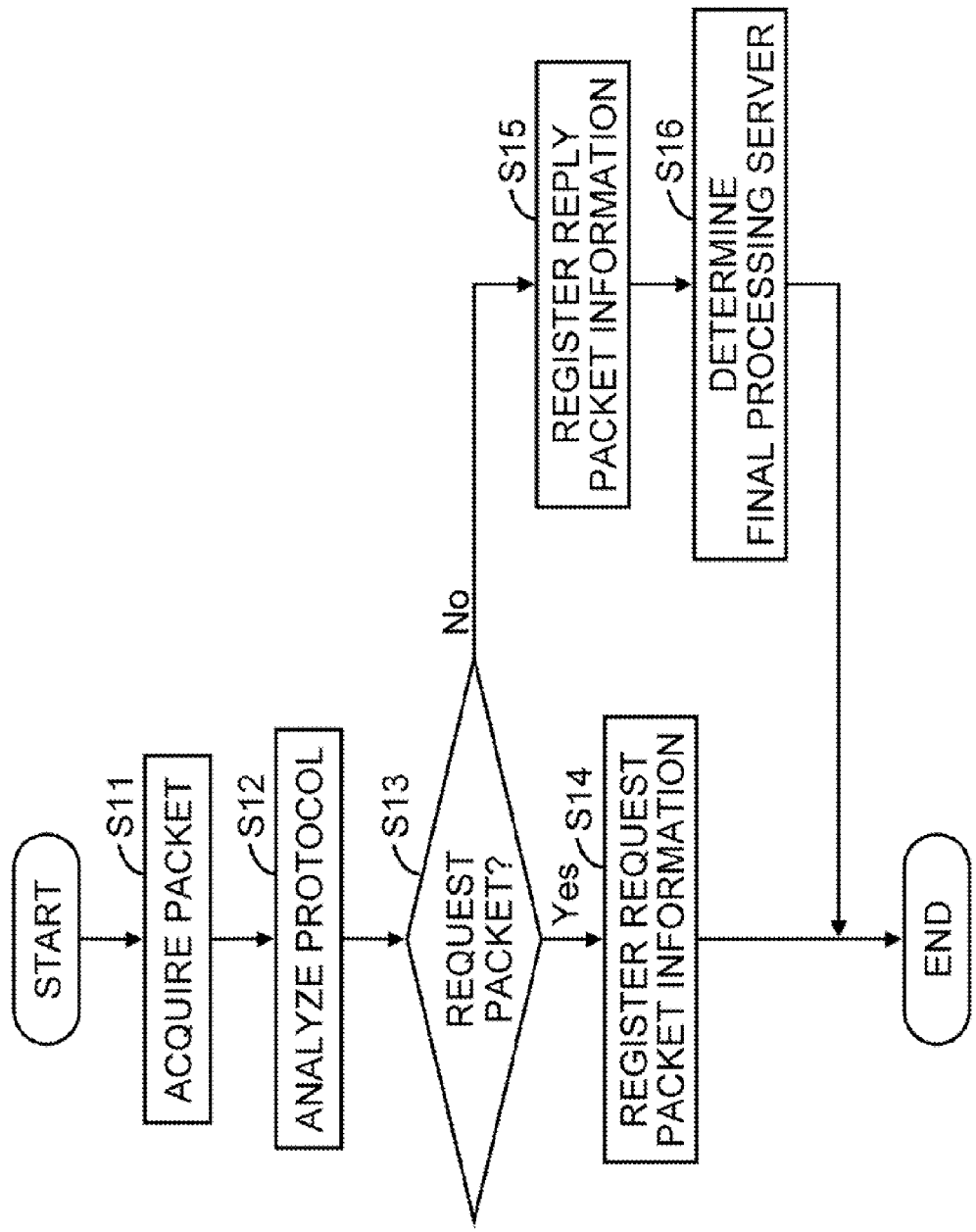
FIG. 5 is a diagram illustrating an exemplary operation flow of a determination apparatus according to an embodiment of the present invention.

Next, operation flow of the determination apparatus 30 will be discussed. FIG. 5 illustrates an exemplary operation flow of the determination apparatus 30 when acquiring a packet.

In S11, when the capturing unit 32 of the determination apparatus 30 acquires a packet via the branch device 15, the capturing unit 32 determines whether or not the acquired packet is a packet to be analyzed. In the present embodiment, it is supposed that the HyperText Transfer Protocol (HTTP) packets indicating transmission control protocol (TCP) port No. 80 are packets to be analyzed. When the capturing unit 32 acquires a packet to be analyzed, the capturing unit 32 transfers the acquired packet to the traffic analyzing unit 33. When the capturing unit 32 acquires a packet that is not to be analyzed, the capturing unit 32 discards the acquired packet.

Whether or not the acquired packet is to be analyzed depends on the configuration of the server device group 20. In the present embodiment, since a web server (front-end server 21) and an application server (back-end server 22) form the server device group 20, HTTP packets indicating TCP port No. 80 are packets to be analyzed. However, when the server device group is configured in a different manner, packets transmitted using another protocol and indicating another port number may be packets to be analyzed.

In S12, the traffic analyzing unit 33 performs a protocol analysis on the packet transferred from the capturing unit 32.

The traffic analyzing unit 33 analyzes the structure of the packet and determines whether the packet is a request packet or a reply packet. In addition, the traffic analyzing unit 33 extracts various parameters from the packet. The extracted parameters include communication addresses of transmitting or receiving devices, port numbers of the transmitting or receiving devices, the type of the request packet, and a reply code, for example.

In S13, the traffic analyzing unit 33 determines whether or not the result of the protocol analysis indicates a request packet.

In S14, when the result of the protocol analysis indicates a request packet ("Yes" in S13), the traffic analyzing unit 33 newly registers information on the request packet in the measured data database 34. In this case, the traffic analyzing unit 33 stores the communication address and port number of the device (client device 10) transmitting the request packet, the communication address and port number of a device (for example, web server) to which the request packet is transmitted, a reception time of the request packet and the request data in the measured data database 34.

In S15, when the result of the protocol analysis does not indicate a request packet ("No" in S13) but indicates a reply packet, the traffic analyzing unit 33 additionally registers information on the reply packet in the measured data database 34. In this case, the traffic analyzing unit 33 retrieves an item regarding a request packet corresponding to the reply packet from the measured data database 34 on the basis of the communication addresses and port numbers of a source and a destination of the reply packet. Then, the traffic analyzing unit 33 adds a reception time, reply data and size information of the reply packet to the retrieved item regarding the request packet. When no corresponding reply packet is acquired for a predetermined time period from a reception time of a request packet, the traffic analyzing unit 33 records, on the corresponding item in the measured data database 34, the fact that the server device group 20 has provided no reply.

In S16, the final processing server determining unit 37 of the determination apparatus 30 determines a final processing server of the packet on the basis of contents registered in the measured data database 34. A procedure for the determination will be discussed later in detail. The final processing server determining unit 37 determines the final processing server of the packet by determining whether or not a URI described in the request data, a file extension described in the request data, or a content type described in the reply data matches the identifier data stored in the configuration information storage unit 36.

When the configuration information storage unit 36 has, stored therein, identifier data that matches the URI, the file extension or the content type, the final processing server determining unit 37 may determine the final processing server of the packet. Thus, the final processing server determining unit 37 registers the result of the determination to an interested field of corresponding item in the measured data database 34.

The determination apparatus 30 repeatedly performs the aforementioned process, and performs registration of data in the measured data database 34 and the determination of a final processing server of a packet as needed.

Figure 6:
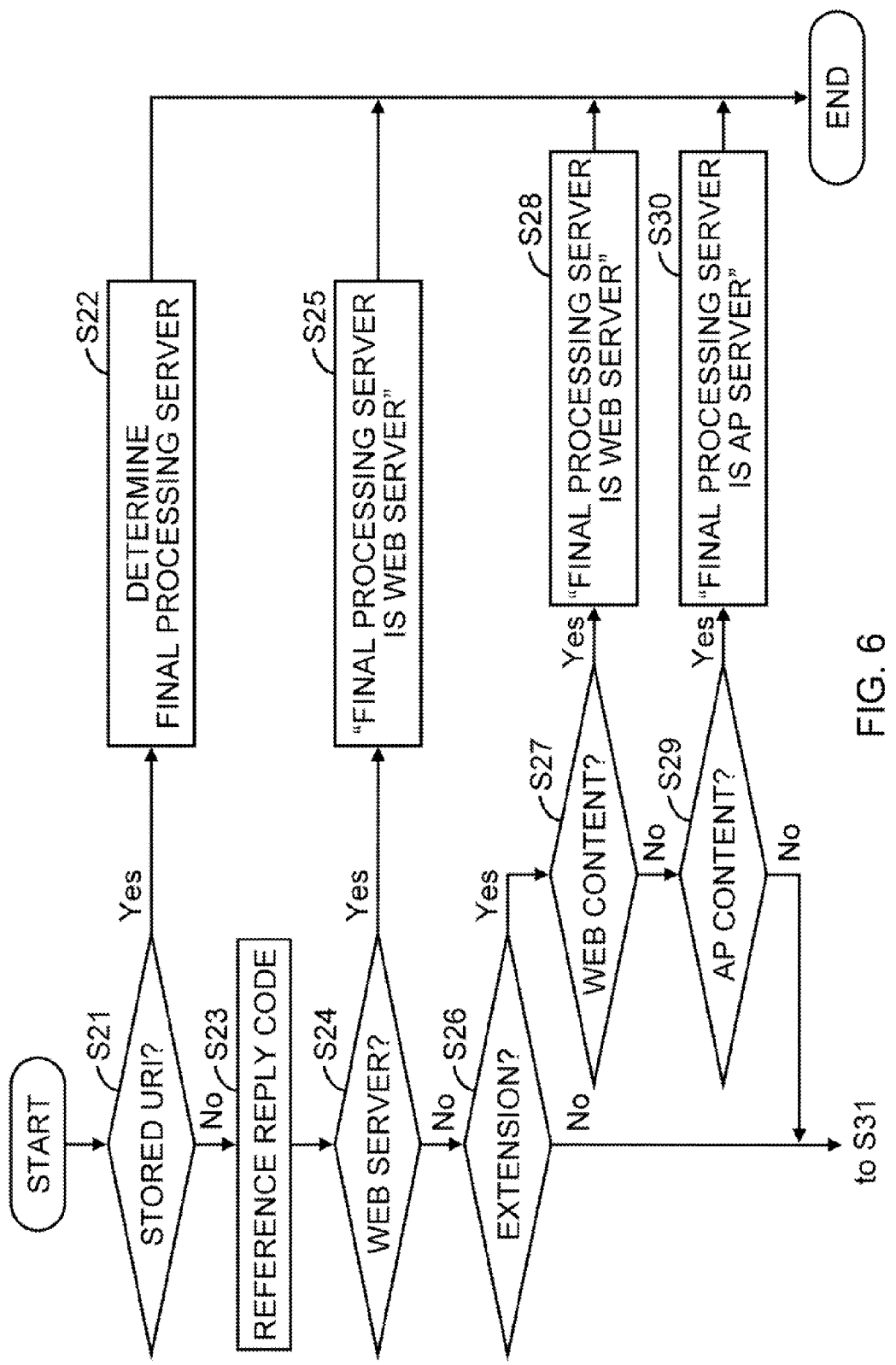
FIGS. 6 and 7 are diagrams illustrating an exemplary operation flow of a determination apparatus according to an embodiment of the present invention.
Figure 7:
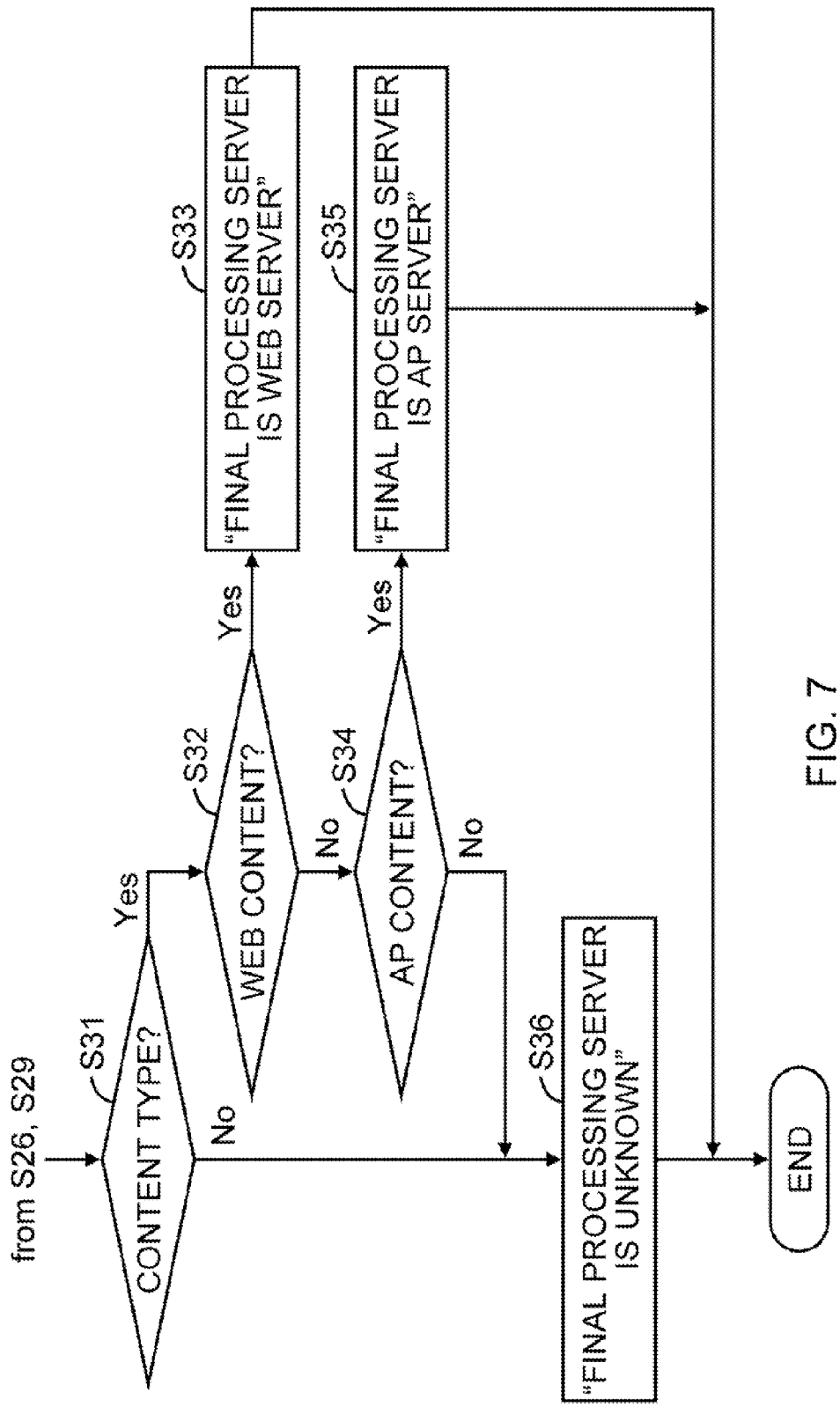

FIGS. 6 and 7 illustrate an exemplary operation flow for the determination that is made by the final processing server determining unit 37.

In S21, the final processing server determining unit 37 determines whether or not the URI included in the request data among the data regarding a target pair of the request packet and reply packet is the same as an URI as the configuration information stored in the configuration information storage unit 36.

In S22, relationship between a URI and a server device (that may be the final processing server of the request packet) is defined in the configuration information storage unit 36. Thus, when the final processing server determining unit 37 determines that the URI included in the request data is the same as the URI stored in the configuration information storage unit 36 ("Yes" in S21), the final processing server determining unit 37 may reference the configuration information and thereby determine a server device that is the final processing server of the packet.

In S23, when the final processing server determining unit 37 determines that the URI included in the request data is not the same as any URI stored in the configuration information storage unit 36 ("No" in S21), the final processing server determining unit 37 references a reply code included in the reply data.

In S24, the final processing server determining unit 37 determines whether or not the reply code included in the reply data is specific to a reply packet originally provided by a web server. In this case, the final processing server determining unit 37 determines whether or not the reply data of the reply packet includes a reply code, such as an error number "404" or the like, which indicates that only a web server responds to the request packet.

In S25, when the reply data includes a reply code that is specific to a reply packet originally provided by a web server ("Yes" in S24), the final processing server determining unit 37 determines that the final processing server of the request packet is a web server.

In S26, when the reply data includes no reply code that is specific to a reply packet originally provided by a web server ("No" in S24), the final processing server determining unit 37 determines whether or not a file extension may be extracted from the request data.

In S27, when the file extension may be extracted ("Yes" in S26), the final processing server determining unit 37 determines whether or not the extracted file extension is specific to a web content (static content).

In S28, when the extracted file extension is specific to a web content ("Yes" in S27), the final processing server determining unit 37 determines that the final processing server of the request packet is a web server.

In S29, when the extracted file extension is not specific to a web content ("No" in S27), the final processing server determining unit 37 determines whether or not the extracted file extension is specific to an application content (dynamic content).

In S30, when the extracted file extension is specific to an application content ("Yes" in S29), the final processing server determining unit 37 determines that the final processing server of the request packet is an application server.

In S31, when the file extension may not be extracted ("No" in S26), or when the extracted file extension is not specific to an application content ("No" in S29), the final processing server determining unit 37 determines whether or not the content type may be extracted from the reply data.

In S32, when the content type may be extracted from the reply data ("Yes" in S31), the final processing server determining unit 37 determines whether or not the extracted content type is specific to a web content (static content).

In S33, when the extracted content type is specific to a web content ("Yes" in S32), the final processing server determining unit 37 determines that the final processing server of the request packet is a web server.

In S34, when the extracted content type is not specific to a web content ("No" in S32), the final processing server determining unit 37 determines whether or not the extracted content type is specific to an application content (dynamic content).

In S35, when the extracted content type is specific to an application content ("Yes" in S34), the final processing server determining unit 37 determines that the final processing server of the request packet is an application server.

In S36, when the content type may not be extracted ("No" in S31), or when the extracted content type is not specific to an application content ("No" in S34), the final processing server determining unit 37 determines that the final processing server of the request packet is unknown.

The aforementioned procedure for the determination is an example. In the present embodiment, the URI, the reply code, the file extension and the content type are determined in this order. However, the URI, the reply code, the file extension and the content type may be determined in any order.

The determination apparatus 30 does not necessarily determine a final processing server of a request packet for each pair of request packet and reply packet. For example, the determination apparatus 30 may accumulate and organize data measured for a predetermined time period for each of URIs or for each of reply codes and determine final processing server of a pair of the packets including the same URI or final processing server of a pair of packets including the same reply code.

In the first embodiment, by acquiring and analyzing traffic that is transmitted and received between the client device 10 and the server device group 20, the determination apparatus 30 may determine whether a final processing server of the traffic is the front-end server 21 or the back-end server 22.

Second Embodiment

In the first embodiment, the final processing server of the packet is determined on the basis of the information manually entered by an operator and registered by the configuration information registering unit 35. Instead, the configuration information registering unit 35 may acquire setup data held in the front-end server 21, and generate configuration information on the basis of the acquired setup data and register the generated configuration information in the configuration information storage unit 36.

In general, the front-end server 21 has a setup file for interoperating with the back-end server 22. The front-end server 21 performs a series of processes by interoperating with the back-end server 22 in accordance with the setup file. For example, when Apache (registered trademark) is employed as the web server (front-end server 21) and Tomcat (registered trademark) is employed as the application server (back-end server 22), the front-end server 21 has a module (mod_jk.so). Apache executes the module (mod_jk.so) to interoperate with Tomcat in accordance with the setup file (mod_jk.conf).

When a description "JkMount/servlet/*worker1" exists in the setup file, this setup means that when the web server (Apache) receives a request packet in which "http://xxx/servlet/*" is described, the request packet is transferred to the application server (Tomcat). A symbol "xxx" included in the request packet indicates the name or IP address of the web server, and a symbol "*" indicates an arbitrary path.

When the aforementioned description or the like exists in the setup file, a final processing server of the request packet in which "http://xxx/servlet/*" is described is the application server.

As discussed above, the description that defines the final processing server of the packet is included in the setup file that is used by the front-end server 21 to interoperate with the back-end server 22. Thus, the determination apparatus 30 may generate the configuration information (to be stored in the configuration information storage unit 36) by acquiring the setup file from the front-end server 21 and analyzing the acquired setup file. For example, the determination apparatus 30 may extract an item of "JkMount" from the setup file, generate information (such as the first item of the configuration information illustrated in FIG. 3), and store the generated information in the configuration information storage unit 36.

In the second embodiment, since the configuration information may be automatically registered, the number of setup errors may be reduced and the accuracy of determining a final processing server of the request packet may be improved. In the second embodiment, when the server device group 20 includes many server devices, or even when the determination apparatus 30 determines a final processing server (of the request packet) that is among many server device groups 20, it is not necessary to manually register the information. Thus, it is possible to save the time and effort to register the information.

Third Embodiment

In the first and second embodiments, information that is included in the request data or the reply data is searched from the identifier data stored in the configuration information storage unit 36, to determine the final processing server of the request packet on the basis of the search results. The final processing server of the packet may be determined by detecting the difference between a communication path through which the reply packet originally provided by the front-end server 21 passes and a communication path through which the reply packet originally provided by the back-end server 22 passes. In addition, the final processing server of the packet may be determined by detecting a change (caused by the difference between processes performed by the servers) in the reply packet.

The third embodiment will discuss that the final processing server of the packet is determined by accumulating, calculating and analyzing the data stored in the measured data database 34.

The determination apparatus 30 according to the present embodiment has the same configuration as the determination apparatus 30 according to the first embodiment. However, the following configuration information is used to determine the final processing server of the packet. FIG. 8 illustrates an exemplary data structure of the configuration information used by the determination apparatus 30 according to the present embodiment. In the example illustrated in FIG. 8, a threshold X (for example, a time of several tens of milliseconds to 1 second) for the minimum value (Delay_min) among turnaround times (time periods between the reception times of the request packets and the reception times of the corresponding reply packets) is registered as one item included in the configuration information. This configuration information defines that when the minimum value among the turnaround times accumulated from the measured data database 34 is equal to or smaller than the threshold X, the final processing server of the packet is a web server. The threshold X is a value set in the assumption that no delay time or an extremely short delay time occurs when a web server originally provides a reply packet and that a turnaround time is in a range of several tens of milliseconds to several seconds when an application server originally provides a reply packet.

As another one item included in the configuration information, a threshold Y (for example, a time of several tens of milliseconds to 1 second) for a variation (Delay_stdev: standard deviation of the turnaround times) in the turnaround times is registered. This configuration information defines that when the variation in the turnaround times accumulated from the measured data database 34 is equal to or smaller than the threshold Y, the final processing server of the packet is a web server. The threshold Y is a value set in the assumption that a time period for a process varies when an application server performs the process and that a time period for a process does not vary or a variation in the time period for the process is extremely small when a web server performs the process.

As yet another one item included in the configuration information, a threshold Z (for example, several bytes) for a variation (Size_stdev: standard deviation of the data sizes) in the data sizes of reply packets is stored. The configuration information defines that when the variation in the data sizes of the reply packets accumulated from the measured data database 34 is equal to or larger than the threshold Z, the final processing server of the packet is an application server. The threshold Z is a value set in the assumption that the data size of a reply packet provided by an application server varies every time the reply packet is provided.

The configuration information registering unit 35 receives the aforementioned configuration information manually entered by an operator, and registers the received configuration information in the configuration information storage unit 36.

Instead, the data stored in the measured data database 34 may be accumulated and organized for each of the URIs or for each of the reply codes. Then, statistical values (such as an average or a distribution) of turnaround times and the data sizes of the reply packets may be calculated, and the aforementioned thresholds X, Y and Z may be set. For example, the data that is stored in the measured data database 34 may be accumulated and organized in advance, and the control unit 31 of the determination apparatus 30 may perform a calculation on the data so that the thresholds X, Y and Z are automatically set.

Figure 9:
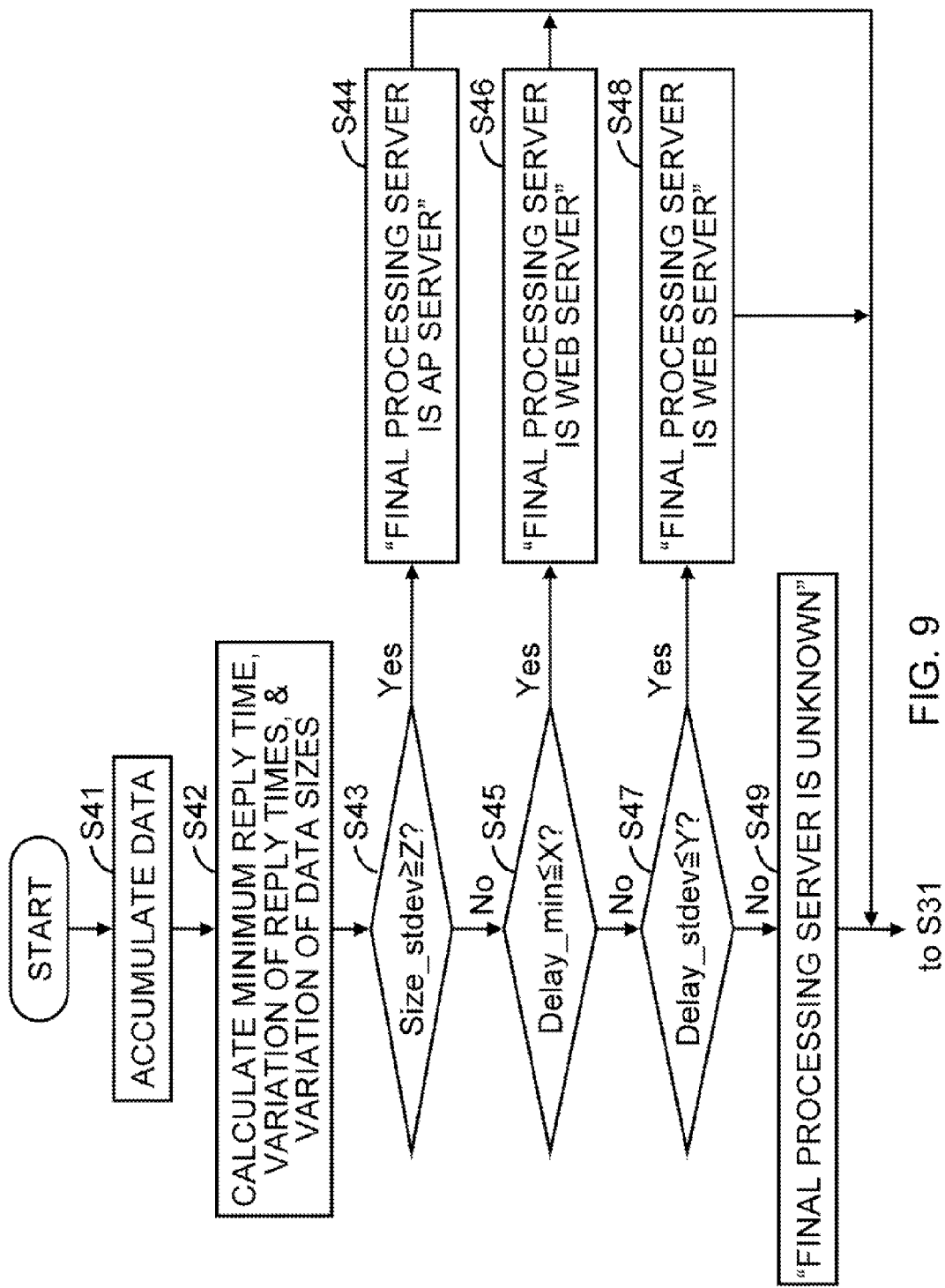
FIG. 9 is a diagram illustrating an exemplary operation flow of a determination apparatus according to an embodiment of the present invention.

FIG. 9 illustrates an exemplary operation flow for a determination that is made by the determination apparatus 30 according to the present embodiment.

In S41, the determination apparatus 30 accumulates and organizes data that has been obtained for a predetermined time period and stored in the measured data database 34. For example, the determination apparatus 30 accumulates and organizes the data for data items including the same URI or for data items including the same reply code.

In S42, the determination apparatus 30 calculates, on the basis of the accumulated data, the minimum value among the turnaround times, the variation (standard deviation) in the turnaround times and the variation (standard deviation) in the data sizes of the reply packets. In other words, in order to prepare the determination, the determination apparatus 30 accumulates and organizes request packets and reply packets relating to the same client device and the same server device group. Then, the determination apparatus 30 calculates the minimum value among the turnaround times, the variation in the turnaround times, and the variation in the data sizes of the reply packets to be used in the determination.

In S43, the determination apparatus 30 determines whether or not the calculated variation in the data sizes of the reply packets is equal to or larger than the threshold Z so as to determine whether or not the data size of the reply packet always varies.

In S44, when the calculated variation in the data sizes of the reply packets is equal to or larger than the threshold Z ("Yes" in S43), the determination apparatus 30 may determine that the data of the reply packet always varies, and the determination apparatus 30 thus determines that the final processing server of the request packet is an application server.

In S45, when the calculated variation in the data sizes of the reply packets is smaller than the threshold Z ("No" in S43), the determination apparatus 30 determines whether or not the calculated minimum value among the turnaround times is equal to or smaller than the threshold X.

In S46, when the calculated minimum value among the turnaround times is equal to or smaller than the threshold X ("Yes" in S45), the reply packets are provided without the need of a processing time, and the determination apparatus 30 thus determines that the final processing server of the request packet is a web server.

In S47, when the calculated minimum value among the turnaround times is larger than the threshold X ("No" in S45), the determination apparatus 30 determines whether or not the calculated variation in the turnaround times is equal to or smaller than the threshold Y.

In S48, when the calculated variation in the turnaround times is equal to or smaller than the threshold Y ("Yes" in S47), the reply packets are provided without a variation in the processing times, and the determination apparatus 30 thus determines that the final processing server of the request packet is a web server.

In S49, when the calculated variation in the turnaround times is larger than the threshold Y ("No" in S47), the determination apparatus 30 determines that the final processing server of the request packet is unknown.

In the present embodiment, the variation in the data sizes, the minimum value among the turnaround times, and the variation in the turnaround times are determined in this order, but may be determined in any order.

In the present embodiment, the final processing server of the packet is determined on the basis of the one possible result ("Yes" or "No") of each of the comparisons of the values calculated from the accumulated data with the thresholds. For example, when the minimum value among the turnaround times or the variation in the turnaround times is equal to or smaller than the interested threshold, the determination apparatus determines that the final processing server of the packet is a web server. When the variation in the data sizes of the reply packets is equal to or larger than the interested threshold, the determination apparatus determines that the final processing server of the packet is an application server. However, the final processing server of the packet may be determined on the basis of two possible results ("Yes" and "No") of each of the comparisons of the values calculated from the accumulated data with the thresholds. For example, when the minimum value among the turnaround times or the variation in the turnaround times is equal to or smaller than the interested threshold, the determination apparatus may determine that the final processing server of the packet is a web server; and when the minimum value among the turnaround times or the variation in the turnaround times is larger than the interested threshold, the determination apparatus may determine that the final processing server of the packet is an application server. When the variation in the data sizes of the reply packets is equal to or larger than the interested threshold, the determination apparatus may determine that the final processing server of the packet is an application server; and when the variation in the data sizes of the reply packets is smaller than the interested threshold, the determination apparatus may determine that the final processing server of the packet is a web server. In each of these cases, the determination apparatus may uniquely determine the final processing server of the packet on the basis of the possible results of each of the comparisons. Thus, the final processing server of the packet may be determined on the basis of any of the aforementioned values calculated from the accumulated data. In addition, the minimum value among the turnaround times, the variation in the turnaround times and the variation in the data sizes of the reply packets may be compared with the interested thresholds, respectively, and the final processing server of the packet may be determined only when the three determination results match each other. When one of the three determination results does not match other determination results, the determination apparatus may determine that the final processing server of the packet is unknown.

Fourth Embodiment

In the first to third embodiments, a final processing server of a packet is determined. However, by accumulating the determination results, it is possible to determine whether or not a failure related to transmission and reception of the packets exists on the basis of the accumulated determination results, and it is also possible to determine the location of the failure on the basis of the accumulated determination results.

The fourth embodiment will discuss that: the results of determinations of final processing servers of packets are accumulated for each of the server devices; whether or not a failure exists is determined; and the location of the failure is determined.

In the present embodiment, the server device group 20 illustrated in FIG. 1 and other server device groups are connected to the communication network N. The determination apparatus 30 acquires, through the communication network N, packets transmitted and received between the client device 10 and each of the server device groups, and stores information regarding the acquired packets in the measured data database 34. The other server device groups have the same configuration as the server device group 20 illustrated in FIG. 1 and includes a front-end server and a back-end server.

The determination apparatus 30 may identify a server device group that has transmitted or received a packet on the basis of a communication address, which is included in the acquired packet, of a server.

Figure 10:
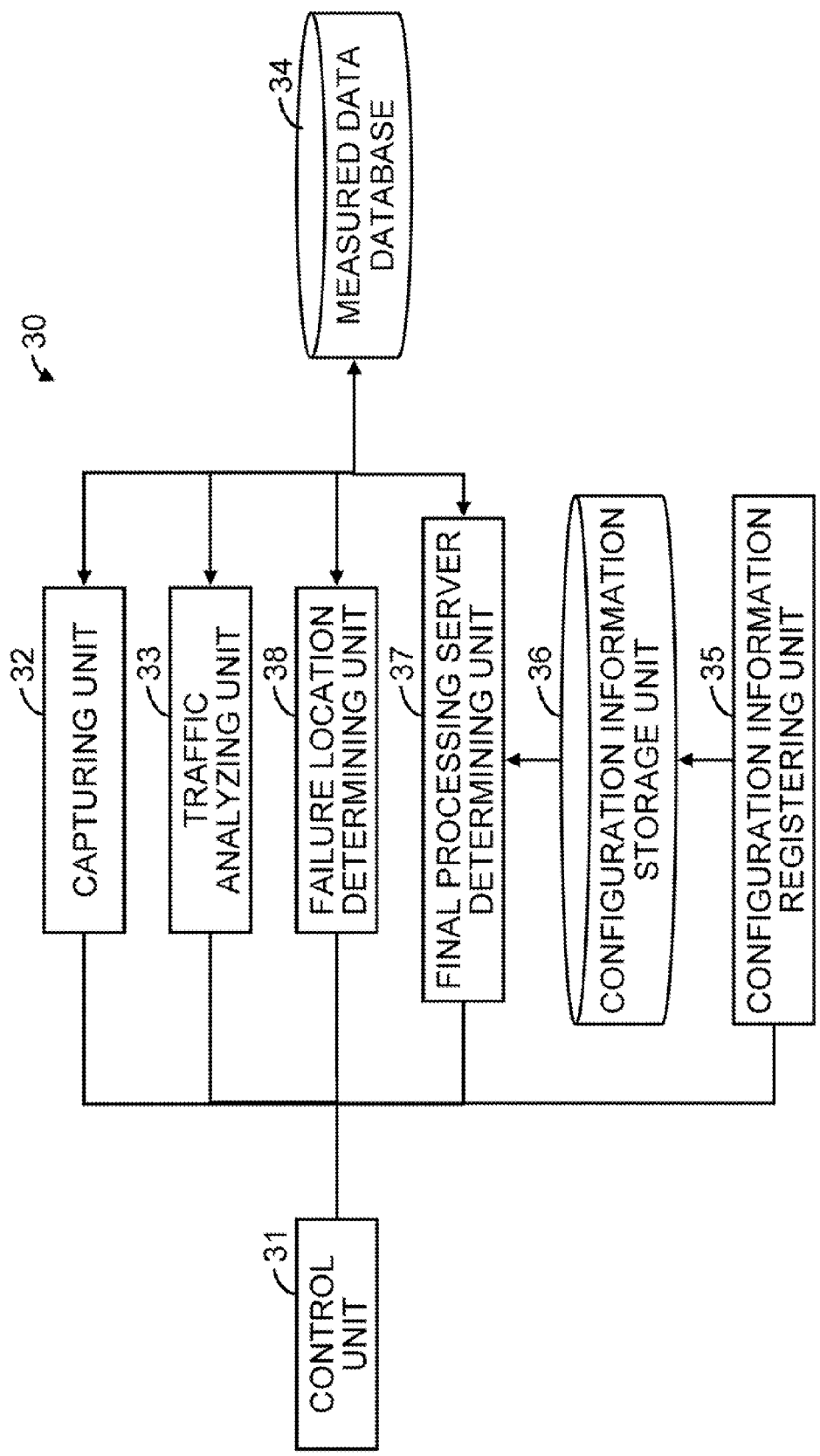
FIG. 10 is a diagram illustrating an exemplary functional configuration of a determination apparatus according to an embodiment of the present invention.

FIG. 10 illustrates an exemplary functional configuration of the determination apparatus 30 according to the present embodiment. The determination apparatus 30 includes the control unit 31, the capturing unit 32, the traffic analyzing unit 33, the measured data database 34, the configuration information registering unit 35, the configuration information storage unit 36 and the final processing server determining unit 37 in the same manner as in the first embodiment. The determination apparatus 30 further includes a failure location determining unit 38.

The failure location determining unit 38 accumulates data stored in the measured data database 34 for each type of replied manners. Specifically, the failure location determining unit 38 counts the number of each type (NG-replied, non-replied, and late-replied) of abnormally replied requests and the number of normally replied requests for each of final processing servers included in the server device groups. The data regarding the NG-replied request stored in the measured data database 34 includes reply data including an error number. The data regarding the non-replied request stored in the measured data database 34 includes no reply data. The turnaround time of the late-replied request is equal to or larger than a predetermined threshold (for example, 1 second or more). In other words, in the data regarding the late-replied request stored in the measured data database 34, the difference between the reception time of the request packet and the reception time of the reply packet is equal to or larger than the predetermined threshold. The normally replied requests are other than the aforementioned abnormally replied requests. Thus, the reply data of the normally replied request includes a reply code indicating that the reply is normally provided.

An example of the results of the accumulation will be discussed below. FIG. 11 illustrates an exemplary data structure of data stored in the measured data database 34 according to the present embodiment. When the failure location determining unit 38 accumulates, from the measured data database 34, data obtained for a predetermined time period (for example, a time period from 10:00 to 10:10) and relating to server device groups with communication addresses "3.1.1.1", "4.1.1.1" and "5.1.1.1" for each of the final processing servers, the following results of the accumulation are obtained.

FIG. 12 illustrates an example of the results of the accumulation according to the present embodiment. For example, the result of the accumulation of data regarding packets transmitted and received between the client device 10 and the server device group with the communication address "3.1.1.1" indicates that the front-end server normally replied one time and the back-end server abnormally replied (NG-replied) two times. The result of the accumulation of data regarding packets transmitted and received between the client device 10 and the server device groups with the communication address "4.1.1.1" indicates that the front-end server abnormally replied (non-replied) one time and the back-end server abnormally replied (non-replied) two times. The result of the accumulation of data regarding packets transmitted and received between the client device 10 and the server device groups with the communication address "5.1.1.1" indicates that the front-end server normally replied one time and the back-end server abnormally replied (late-replied) two times.

The failure location determining unit 38 determines whether or not a failure exists on the basis of the results of the accumulations as illustrated in FIG. 12. When a failure exists, the failure location determining unit 38 determines the location of the failure on the basis of the results of the accumulations. For example, when the failure location determining unit 38 accumulates data for each of the server device groups, and no abnormal reply is provided, the failure location determining unit 38 determines that no failure related to transmission and reception of packets between the server device group and the client device 10 exists. When abnormal replies are detected from only the back-end server, the failure location determining unit 38 determines that a communication failure occurs owing to the back-end server (or the failure location determining unit 38 determines that the location of the failure is the back-end server). When abnormal replies are detected from the front-end server and the back-end server, the failure location determining unit 38 determines that a communication failure occurs owing to the front-end server (or the failure location determining unit 38 determines that the location of the failure is the front-end server).

When abnormal replies are detected from only the front-end server, the failure location determining unit 38 may not determine whether a failure exists on a communication path or in the front-end server, and the failure location determining unit 38 thus determines that the location of the failure is unknown.

Figure 13:
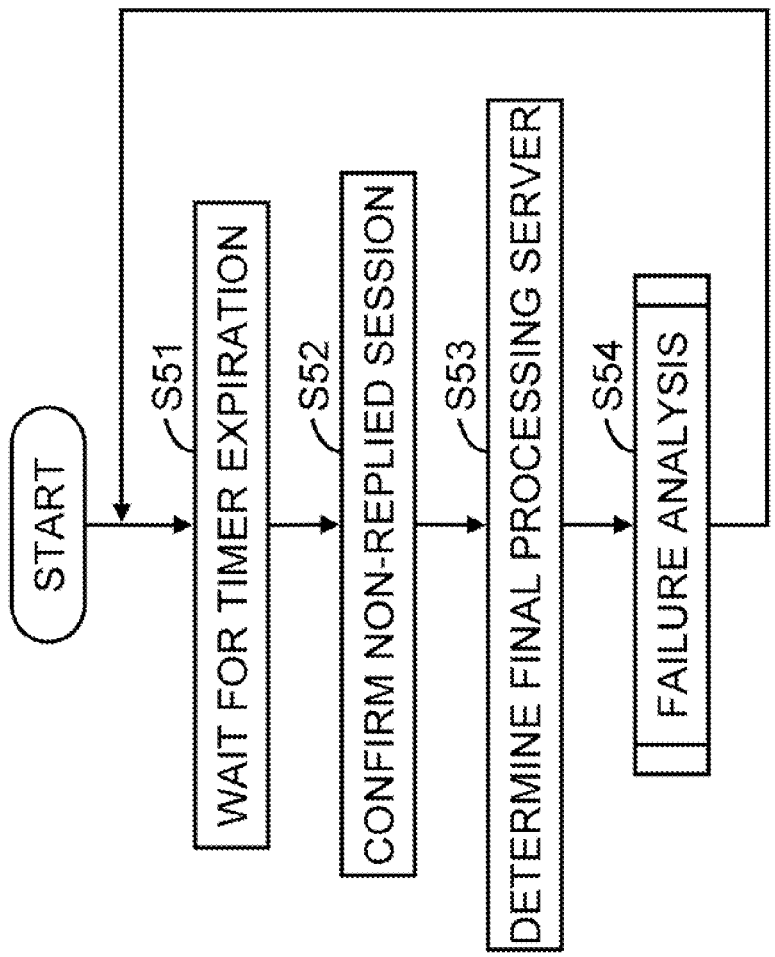
FIG. 13 is a diagram illustrating an exemplary operation flow of a determination apparatus according to an embodiment of the present invention.

FIG. 13 illustrates an exemplary operation flow of the determination apparatus 30 according to the present embodiment.

In S51, the determination apparatus 30 waits until a timer expires. In other words, the determination apparatus 30 waits for a certain time period (for example, 5 minutes).

In S52, the determination apparatus 30 periodically calls a process for confirming a non-replied session.

In order to confirm the non-replied session, the determination apparatus 30 extracts, from the measured data database 34, all data items that have no data regarding reply packets, and records the fact that no reply packet is provided in a field of a reception time of the reply packet when no reply packet is acquired for a predetermined time period (for example, 2 minutes) from a reception time of a request packet.

In S53, the final processing server determining unit 37 of the determination apparatus 30 determines a final processing server of the request packet. As a method for determining the final processing server of the request packet, any of the methods discussed in the first to third embodiments may be used. For example, when the determination method discussed in the third embodiment is used, the final processing server of the request packet is determined by analyzing, for each of URIs, a turnaround time, a data size and the like, on the basis of data stored in the measured data database 34.

In S54, the failure location determining unit 38 of the determination apparatus 30 performs a failure analysis. In the failure analysis, the failure location determining unit 38 analyzes data that has been stored in the measured data database 34 since the previous start of waiting for timer expiration, to detect a failure and determine the location of the failure. After the failure analysis, the determination apparatus 30 returns the process to S51.

Figure 14:
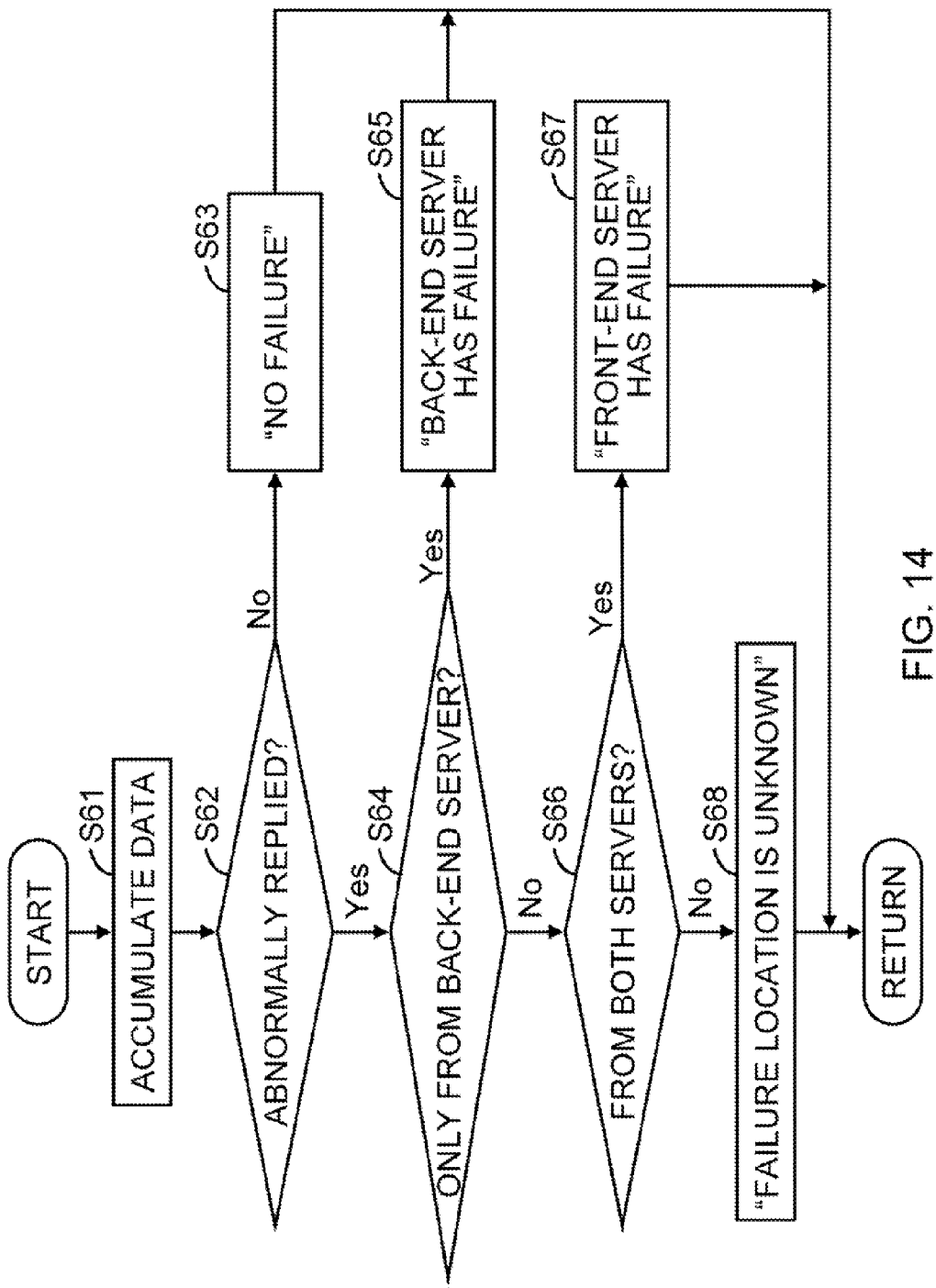
FIG. 14 is a diagram illustrating an exemplary operation flow of a determination apparatus according to an embodiment of the present invention.

FIG. 14 illustrates an exemplary operation flow of the failure analysis that is performed by the failure location determining unit 38.

In S61, the failure location determining unit 38 accumulates the data that has been stored in the measured data database 34 since the previous start of waiting for timer expiration. Specifically, the failure location determining unit 38 counts, for each of the final processing servers included in the server device groups, the number of each type (NG-replied, non-replied, and late-replied) of abnormally replied requests and the number of normally replied requests. The failure location determining unit 38 stores the counting results in a memory.

In S62, the failure location determining unit 38 determines, for each of the server device groups, whether or not any of the server devices included in the each server device group abnormally replies.

In S63, when no server device included in the server device group abnormally replies ("No" in S62), the failure location determining unit 38 determines that no failure exists.

In S64, when the failure location determining unit 38 determines that some server devices included in the server device group abnormally replies ("Yes" in S62), the failure location determining unit 38 determines whether or not only the back-end server abnormally replies.

In S65, when the failure location determining unit 38 determines that only the back-end server abnormally replies ("Yes" in S64), the failure location determining unit 38 determines that a failure occurs owing to the back-end server, and the failure location determining unit 38 determines that the location of the failure is the back-end server.

In S66, when the failure location determining unit 38 determines that the front-end server abnormally replies ("No" in S64), the failure location determining unit 38 determines whether or not both the front-end server and the back-end server abnormally reply.

In S67, when the failure location determining unit 38 determines that both the front-end server and the back-end server abnormally reply ("Yes" in S66), the failure location determining unit 38 determines that a failure occurs owing to the front-end server, and the failure location determining unit 38 determines that the location of the failure is the front-end server.

In S68, when the failure location determining unit 38 determines that only the front-end server abnormally replies ("No" in S66), the failure location determining unit 38 may not determine the location of a failure and thus determines that the location of the failure is unknown.

In the fourth embodiment, whether or not a failure exists may be detected by accumulating and analyzing traffic conditions (the state of a reply and a delay of the reply) from the side of the client device 10 (service entrance). In addition, which one of the front-end server and the back-end server causes the occurrence of the failure may be determined.

Figure 15:
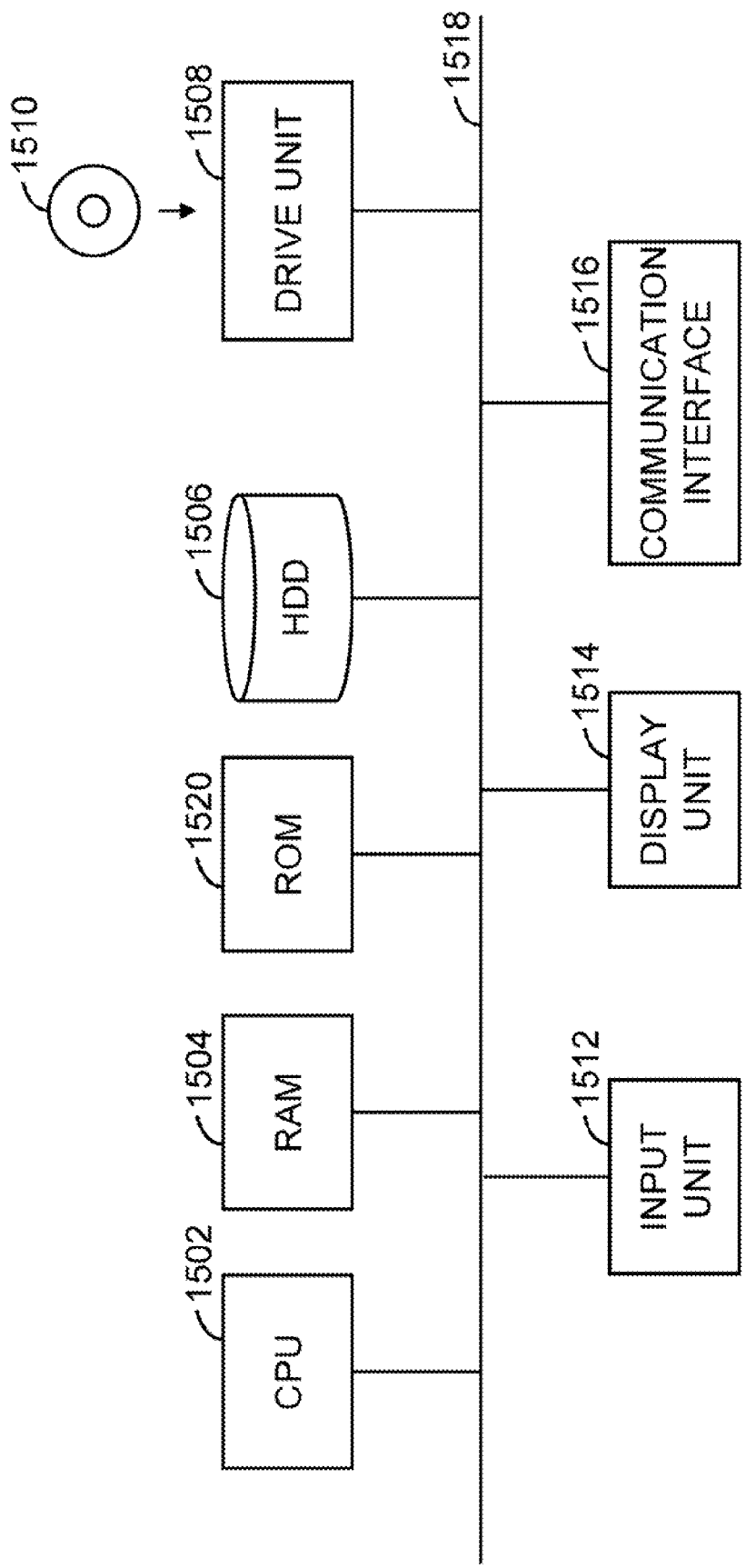
FIG. 15 is a diagram illustrating an exemplary system configuration of a computer.

The functions of the determination apparatus 30 may be achieved by a computer by executing software. FIG. 15 illustrates an exemplary system configuration of the computer. The computer illustrated in FIG. 15 includes a central processing unit (CPU) 1502 for executing the software such as operating system (OS) and application programs, a random access memory (RAM) 1504 for temporarily storing data, a hard disk drive (HDD) 1506 for storing data, a drive unit 1508 for reading data from and/or writing data to a computer-readable recording medium 1510, an input unit 1512 for accepting user input, a display unit 1514 for displaying data, and a communication interface 1516 for establishing a connection to a network. These components are connected to each other via a bus 1518. The software may be stored in the computer-readable recording medium 1510 such as a compact disc (CD), a compact disc read-only memory (CD-ROM), CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc, when delivered, installed onto the HDD 1506 from the computer-readable recording medium 1510, and loaded into the RAM 1504 from the HDD 1506 when executed by the CPU 1502. The software may be delivered over the network. Alternatively, the software may be stored in advance in a read-only memory (ROM) 1520 to be read out and executed by the CPU 1502.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A determination apparatus comprising:
a storage unit to store source configuration information for determining a source of a reply packet, wherein the source configuration information includes at least one of a uniform resource identifier, a file extension, a content type, and a reply code indicating a reply content; and
a processor coupled to a memory, the memory storing a computer program comprising instructions, wherein the instructions are executed by the processor to:
acquire through a communication network a request packet transmitted from a client device to a server device group or the reply packet transmitted from the server device group to the client device, the server device group including a first server device and one or more second server devices, the first server device being connected to the client device through the communication network;
upon acquiring a request packet, register information of the request packet in a database, storing a source address, a destination address, a request data and a reception time of the request packet;
upon acquiring a reply packet, register information of the reply packet in the database, by retrieving a corresponding request packet information item from the database based on a source and a destination of the reply packet, and adding a reception time, reply data and size information of the reply packet to the retrieved item;
compare the registered information of the reply packet with the source configuration information to determine whether a source of the reply packet is the first server device or one of the second server devices; and
when no corresponding reply packet is acquired for a predetermined time period from the reception time of the request packet, record in a corresponding database item that the server device group has provided no reply.

2. The determination apparatus according to claim 1, wherein the first server device and the second server devices interoperate with each other in accordance with preset information, and the processor
acquires the preset information,
generates source configuration information from the acquired preset information, and
stores the generated source configuration information in the storage unit.

3. The determination apparatus according to claim 1, wherein the source configuration information varies with a process performed by the first server device or the second server devices in response to the request packet.

4. The determination apparatus according to claim 1, wherein the processor
accumulates registered information regarding acquired packets relating to the same client device and the same server device group, and
determines, based on the accumulated registered information, whether a source of the reply packets included in the acquired packets relating to the same client device and the same server device group is the first server device or one of the second server devices.

5. The determination apparatus according to claim 1, wherein the processor
accumulates results of the determination of the source of reply packets,
detects a failure on packet transfer based on the basis of the accumulated results, and
determines, based on the accumulated results, whether a cause of the failure is the first server device or one of the second server devices.

6. A determination method executed by a determination apparatus, the determination method comprising:
storing a source configuration information for determining a source of a reply packet, wherein the source configuration information includes at least one of a uniform resource identifier, a file extension, a content type, and a reply code indicating a reply content;

acquiring through a communication network a request packet transmitted from a client device to a server device group and a reply packet transmitted from the server device group to the client device, the server device group including a first server device and one or more second server devices, the first server device being connected to the client device through the communication network;

upon acquiring a request packet, registering information of the request packet in a database, storing a source address, a destination address, a request data and a reception time of the request packet;

upon acquiring a reply packet, registering information of the reply packet in the database, by retrieving a corresponding request packet information item from the database based on a source and a destination of the reply packet, and adding a reception time, reply data and size information of the reply packet to the retrieved item;

comparing, the registered information of the reply packet with the source configuration information to determine whether a source of the reply packet is the first server device or one of the second server devices; and when no corresponding reply packet is acquired for a predetermined time period from the reception time of a request packet, recording, in a corresponding database item, that the server device group has provided no reply.

7. The determination method according to claim 6, wherein the source configuration information varies with a process performed by the first server device or the second server devices in response to the request packet.

8. A computer-readable, non-transitory medium storing a program that causes a computer to perform a procedure comprising:

storing a source configuration information for determining a source of a reply packet, wherein the source configuration information includes at least one of a uniform resource identifier, a file extension, a content type, and a reply code indicating a reply content;

acquiring through a communication network a request packet transmitted from a client device to a server device group or a reply packet transmitted from the server device group to the client device, the server device group including a first server device and one or more second server devices, the first server device being connected to the client device through the communication network;

upon acquiring a request packet, registering information on the request packet in a database, storing a source address, a destination address, a request data and a reception time of the request packet;

upon acquiring a reply packet, registering information on the reply packet in the database, by retrieving a corresponding request packet information item from the database based on a source and a destination of the reply packet, and adding a reception time, reply data and size information of the reply packet to the retrieved item;

comparing, the registered information of the reply packet with the source configuration information to determine whether a source of the reply packet is the first server device or one of the second server devices; and when no corresponding reply packet is acquired for a predetermined time period from the reception time of a request packet, recording, in a corresponding database item, that the server device group has provided no reply.

9. The computer-readable, non-transitory medium according to claim 8, wherein the source configuration information varies with a process performed by the first server device or the second server devices in response to the request packet.

* * * * *